(12) United States Patent
Jensen

(10) Patent No.: US 11,102,954 B2
(45) Date of Patent: Aug. 31, 2021

(54) BICYCLE-MOUNTED PLATFORM AND BRACE FOR PET TRANSPORT

(71) Applicant: Chris Jensen, Northville, MI (US)

(72) Inventor: Chris Jensen, Northville, MI (US)

(73) Assignee: Chris Jensen, Northville, MI (US)

( * ) Notice: Subject to any disclaimer, the term of this patent is extended or adjusted under 35 U.S.C. 154(b) by 28 days.

(21) Appl. No.: 16/685,215

(22) Filed: Nov. 15, 2019

(65) Prior Publication Data

US 2021/0144953 A1 May 20, 2021

(51) Int. Cl.
*B62J 9/21* (2020.01)
*A01K 1/02* (2006.01)

(52) U.S. Cl.
CPC .............. *A01K 1/0281* (2013.01); *B62J 9/21* (2020.02)

(58) Field of Classification Search
CPC ......... B62J 9/21; B62J 1/16; B62J 1/28; B62J 1/167; A01K 1/0281; B62K 19/40
See application file for complete search history.

(56) References Cited

U.S. PATENT DOCUMENTS

| | | | | |
|---|---|---|---|---|
| 3,765,375 A | * | 10/1973 | Young | B62J 7/02 119/771 |
| 4,226,347 A | * | 10/1980 | Rice | B62J 9/40 224/418 |
| 4,305,532 A | * | 12/1981 | Reminger | B62J 7/02 224/415 |
| 4,638,933 A | * | 1/1987 | Boufford | B62J 9/21 224/421 |
| 5,052,704 A | * | 10/1991 | Nauman | B62J 1/167 280/202 |
| 5,190,306 A | * | 3/1993 | Nauman | B62J 1/167 224/159 |
| 5,470,092 A | * | 11/1995 | Fardy | B62K 19/46 280/202 |
| 5,622,374 A | * | 4/1997 | Rudeen | B62J 1/16 224/415 |
| 5,927,801 A | * | 7/1999 | Miree | B62J 1/167 297/195.1 |
| 6,264,223 B1 | * | 7/2001 | Loewke | B62J 1/167 280/202 |
| 7,174,852 B2 | * | 2/2007 | Jefferson | B62J 9/22 119/496 |

(Continued)

*Primary Examiner* — Brian D Nash
(74) *Attorney, Agent, or Firm* — Harness, Dickey & Pierce, P.L.C.

(57) ABSTRACT

A bicycle carrier for the transport of small animals is provided. The carrier includes a platform member coupleable to a top tube of a bicycle frame and a brace member coupleable to handlebars of the bicycle. The platform member includes a base member, a plurality of side members, and a coupling member. The side members extend from one or more longitudinal edges of the base member so as to define a pod. The coupling member extends from the base member and couples the platform member to a seat post of the bicycle. The brace member includes at least one spring and a bumper member. The at least one spring may extend perpendicularly from the handlebars. The bumper member may be coupled to a distal end of the at least one spring. The brace member may assist in the positioning of the animal during transport, including for example, over uneven terrain.

18 Claims, 3 Drawing Sheets

(56) References Cited

U.S. PATENT DOCUMENTS

Figure 1A:
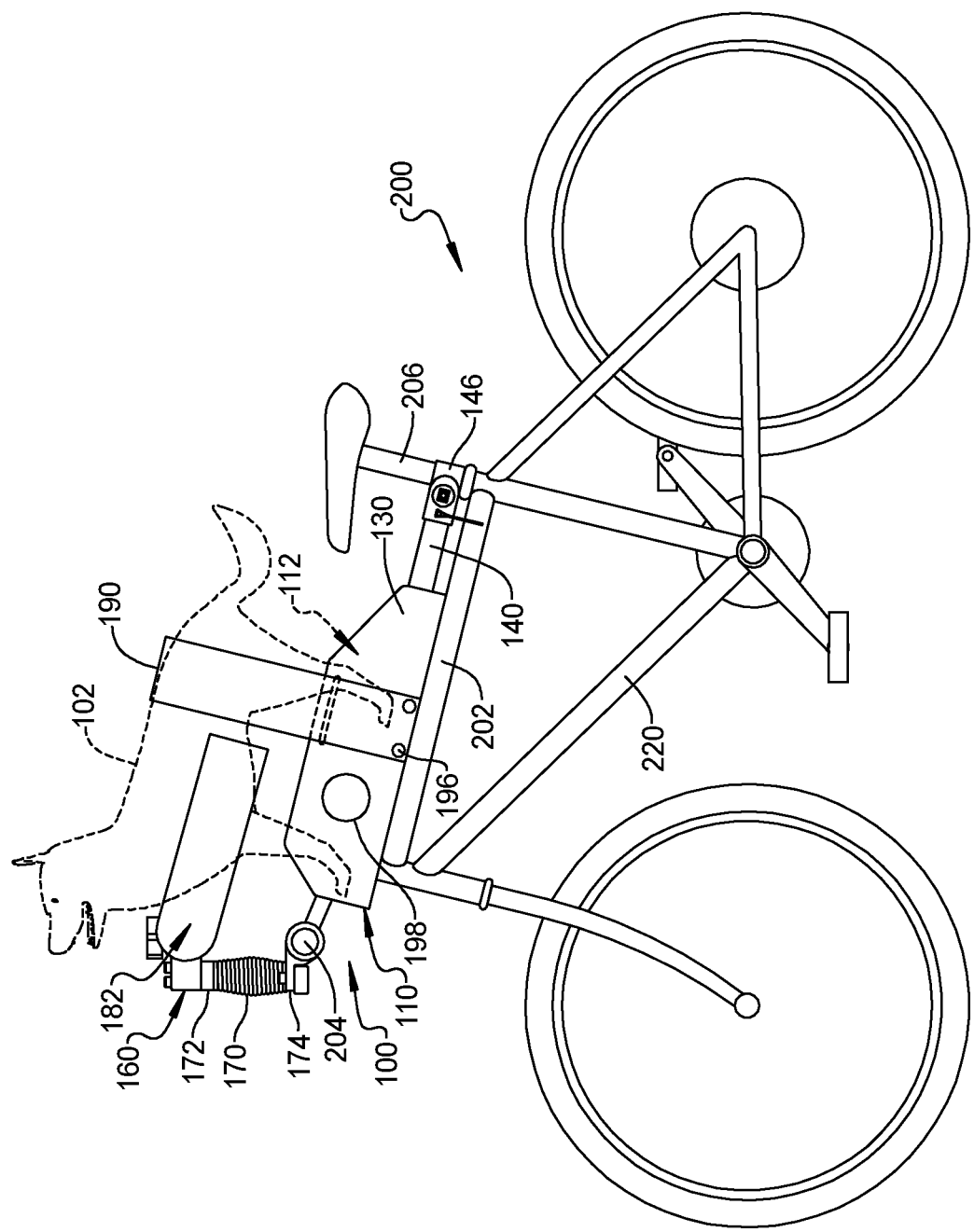

| | | | |
|---|---|---|---|
| 7,523,986 B2* | 4/2009 | Jefferson | B62J 1/167 |
| | | | 297/195.13 |
| 10,266,224 B2* | 4/2019 | Provost | B62J 1/28 |
| 2003/0080594 A1* | 5/2003 | Geyer | B62K 19/36 |
| | | | 297/215.13 |
| 2004/0155435 A1* | 8/2004 | Watts | B62B 1/206 |
| | | | 280/652 |
| 2005/0035166 A1* | 2/2005 | Kresge | A01K 1/0281 |
| | | | 224/431 |
| 2009/0256406 A1* | 10/2009 | Schrooten | B62B 7/142 |
| | | | 297/256.16 |
| 2013/0220231 A1* | 8/2013 | Hovsepian | B62J 9/00 |
| | | | 119/496 |
| 2016/0243996 A1* | 8/2016 | Anton | B60R 9/06 |
| 2016/0362155 A1* | 12/2016 | Ton | B62J 7/04 |
| 2017/0021890 A1* | 1/2017 | Barak | B62J 1/08 |
| 2017/0129564 A1* | 5/2017 | Provost | B62K 3/04 |
| 2017/0240236 A1* | 8/2017 | Enriquez | A47C 7/002 |
| 2019/0061863 A1* | 2/2019 | Lee | B62M 6/90 |
| 2020/0329666 A1* | 10/2020 | Blood | B62J 9/21 |

\* cited by examiner

//BICYCLE-MOUNTED PLATFORM AND BRACE FOR PET TRANSPORT

FIELD

The present disclosure relates to a bicycle-mounted platform and brace for pet transport.

BACKGROUND

This section provides background information related to the present disclosure which is not necessarily prior art.

Traveling by bicycle with small pets is often desirable. Many different kinds of specialized carriers for bicycles have been fashioned over the years, for example carriers are often mounted above the rear wheel behind the rider or extending from the front handle bars. However, such assemblies may affect the front to back and/or side to side balance of the bicycle and, as such, the safety of the bicycle and its rider. Further, such designs often place the pet outside of the reach and control, and in the example of rear mounted carriers outside of the line of sight, of the bicycle rider. Accordingly, it would be desirable to develop bicycle-mounted assemblies that are easily attachable to and removable from bicycles that also position pets within the reach and control of the rider so as to improve the safety of bicycle for both the rider and pet.

SUMMARY

This section provides a general summary of the disclosure, and is not a comprehensive disclosure of its full scope or all of its features.

The present disclosure provides a bicycle carrier for the transport of small animals. The bicycle carrier includes a platform member coupleable to a top tube of a bicycle frame and a brace member coupleable to handlebars of the bicycle. The platform member includes a base member, a plurality of side members, and a coupling member. The side members may extend perpendicularly from one or more longitudinal edges of the base member so as to define a pod. The coupling member may extend from the base member and may couple the platform member to a seat post of the bicycle. The brace member includes at least one spring and a bumper member. The at least one spring may be configured to extend perpendicularly from the handlebars. The bumper member may be coupled to a distal end of the at least one spring.

In one aspect, a proximal end of the coupling member may be embedded in the base member, and a distal end of the coupling member that is separated from the proximal end may be coupled to the seat post of the bicycle.

In one aspect, the base member may be a laminate comprising a plurality of layers. A proximal end of the coupling member may be disposed between a first layer and a second layer of the plurality of layers, and a distal end of the coupling member that is separated from the proximal end may be coupled to the seat post of the bicycle.

In one aspect, the base member is a laminate comprising a plurality of layers. Each side member of the plurality of side members may include a flanged edge, and the flanged edge may be disposed between a first layer and a second layer of the plurality of layers.

In one aspect, the base member comprises a first layer parallel with a second layer and a third layer disposed therebetween. The third layer includes a first portion and a second portion lateral to the first portion. A proximal end of the coupling member may be disposed between the first portion and the second portion of the third layer, and a distal end of the coupling member that is separated from the proximal end may be coupled to the seat post of the bicycle.

In one aspect, each side member of the plurality of side members may include a flanged edge and each of the flanged edges may be coupled to the one or more longitudinal edges of the base member.

In one aspect, each of the plurality of side members may include a distal edge separated from the flanged edge, and the distal edge may be covered with one or more edge guards.

In one aspect, the coupling member may include a proximal coupling that couples a proximal end of the coupling member to the base member and a distal coupling that couples a distal end of the coupling member to the seat post of the bicycle. The distal coupling may be a quick-release coupler.

In one aspect, the platform member may further include a safety belt. The safety belt may be coupled to one of the base member and the plurality of side members.

In one aspect, a first end of the safety belt may be removably coupled to a first side of the platform member and a second end of the safety belt may be coupled to a second side of the platform member.

In one aspect, one or more surfaces of the platform member may include a washable cover.

In one aspect, an exposed portion of the pod may be covered with a traction-assisting material.

In one aspect, at least one side member of the plurality of side members includes an integrated speaker.

In one aspect, a proximal end of the at least one spring may be separated from the distal end and may be removably coupled to the handlebars.

In one aspect, the proximal end of the at least one spring includes a quick release coupler.

In one aspect, two springs may be configured to extend perpendicularly from the handlebars.

In one aspect, the bumper member may be covered with a padding material.

In various other aspects, the present disclosure provides another bicycle carrier for the transport of small animals. The bicycle carrier includes a platform member and a brace member. The platform member may be removably coupled to a top tube of a bicycle frame. The brace member may be coupleable to a handlebars of the bicycle. The platform member may include a base member, a plurality of side members, and a coupling member. The base member may include a first layer that is parallel with a second layer. A third layer may be disposed between the first layer and the second layer. The third layer may include a first portion and a second portion that is lateral to the first portion. The plurality of side members may extend perpendicularly from one or more longitudinal edges of the base member so as to define a pod. The coupling member may have a proximal portion that is embedded within the base member. For example, the proximal portion may be disposed between the first portion and the second portion of the third layer. The coupling member may further include a distal portion that is separated from the proximal portion and that is configured to removably couple the platform member to a seat post of the bicycle. The brace member may include at least one spring and a bumper member. The at least one spring may have a proximal end that is removably coupleable to the handlebars of the bicycle. The bumper member may be coupled to a distal end of the at least one spring away from the proximal end and the handlebars of the bicycle. The bumper member may assist is the positioning of the animal.

In one aspect, the distal portion of the coupling member may include a first quick-release coupler. Likewise, the proximal end of the at least one spring may include a second quick-release coupler.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Figure 1B:
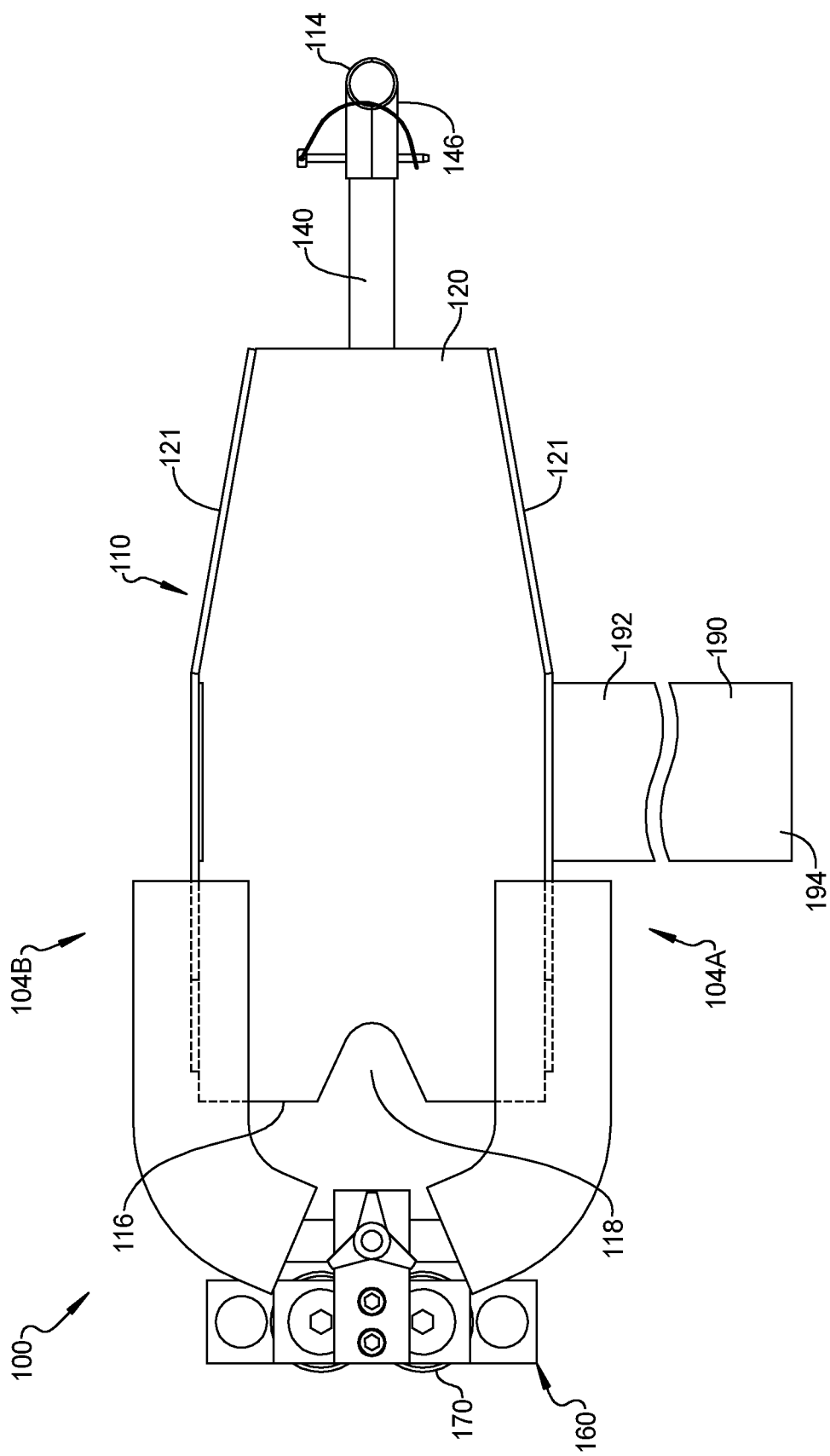
Figure 1C:
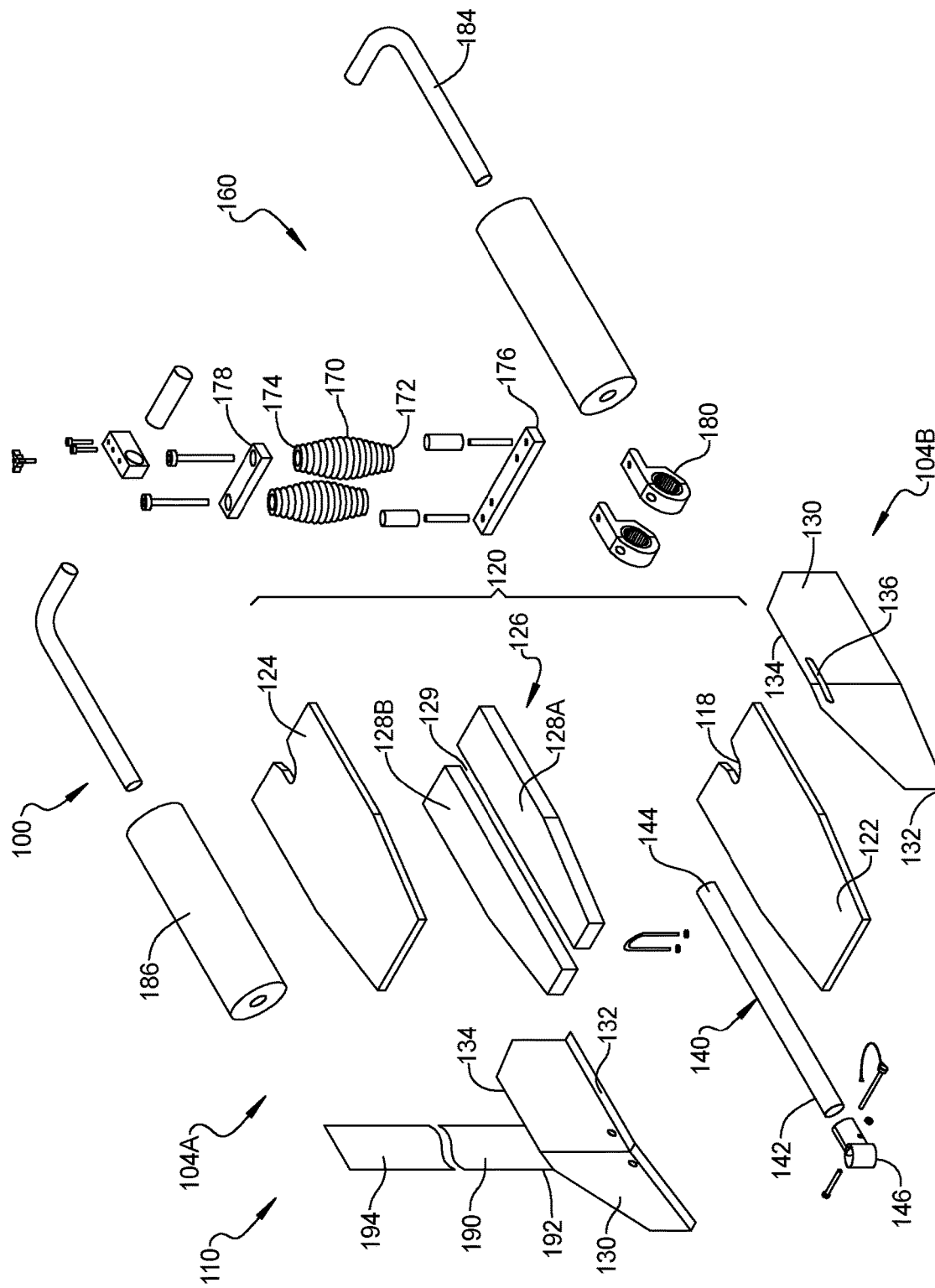

FIG. 1A provides an exemplary illustration of a quick-release bicycle carrier, as attached to a bicycle, in accordance with various aspects of the present disclosure;

FIG. 1B is a top-down view of the quick-release bicycle carrier illustrated in FIG. 1A; and FIG. 1C is an exploded view of the quick-release bicycle carrier illustrated in FIG. 1A.

Corresponding reference numerals indicate corresponding parts throughout the several views of the drawings.

DETAILED DESCRIPTION

Example embodiments will now be described more fully with reference to the accompanying drawings.

Example embodiments are provided so that this disclosure will be thorough, and will fully convey the scope to those who are skilled in the art. Numerous specific details are set forth, such as examples of specific components, devices, and methods, to provide a thorough understanding of embodiments of the present disclosure. It will be apparent to those skilled in the art that specific details need not be employed, that example embodiments may be embodied in many different forms, and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a", "an", and "the" may be intended to include the plural forms as well, unless the context clearly indicates otherwise. The terms "comprises", "comprising", "including", and "having", are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on", "engaged to", "connected to", or "coupled to" another element or layer, it may be directly on, engaged, connected, or coupled to the other element or layer, or intervening elements or layers may be present. In contrast, when an element is referred to as being "directly on", "directly engaged to," "directly connected to", or "directly coupled to" another element or layer, there may be no intervening elements or layers present. Other words used to describe the relationship between elements should be interpreted in a like fashion (e.g., "between" versus "directly between", "adjacent" versus "directly adjacent", etc.). As used herein, the term "and/or" includes any and all combinations of one or more of the associated listed items.

Although the terms first, second, third, etc. may be used herein to describe various elements, components, regions, layers and/or sections, these elements, components, regions, layers, and/or sections should not be limited by these terms. These terms may be only used to distinguish one element, component, region, layer, or section from another region, layer, or section. Terms such as "first", "second", and other numerical terms when used herein do not imply a sequence or order unless clearly indicated by the context. Thus, a first element, component, region, layer, or section discussed below could be termed a second element, component, region, layer, or section without departing from the teachings of the example embodiments.

Spatially relative terms, such as "inner", "outer", "beneath", "below", "lower", "above", "upper", and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The present disclosure provides a bicycle carrier for the transport of small animals, for example animals less than about 35 lbs. FIG. 1A provides an exemplary illustration of a bicycle carrier 100 as attached to a bicycle 200. The bicycle carrier 100 may include a platform member 110 and a brace member 160. The platform member 110 may be removably coupled to a top tube 202 of the bicycle 200. The brace member 160 may be removably coupled to handlebars 204 of the bicycle 200. The platform member 110 defines a stall or pod 112 for placement of the animal 102, and the brace member 160 assists in the positioning of the animal 102 for safe transport. In various aspects, one or more surfaces of the pod 112 may be covered with a cushioning material and/or washable cover. In certain variations, the cushioning material and/or washable cover may have a traction-assisting pattern or texture. The traction-assisting pattern or texture may help the animal 102 maintain stance or position during travel on the bicycle 200.

As best seen in FIG. 1B, the platform member 110 includes a first end 114 distal from a second end 116. The first end 114 includes a coupling 146, for example a quick-release coupling, that couples the platform member 110 to the bicycle 200, for example as illustrated, to a seat post 206 of the bicycle 200. The second end 116 of the platform member 110 may rest on the top tube 202 of the bicycle 200. The second end 116 of the platform member 110 may include a notch 118. The notch 118 may aid in the positioning of the platform member 110. For example, the notch 118 may receive the headset or headset spacer of the bicycle 200. The handlebars 204 of the bicycle 200 are coupled to a distal end of the headset or headset spacer.

In various aspects, the platform member 110 includes, as best seen in FIGS. 1B and 1C, a base member 120, a plurality of side members 130, and a coupling member 140 extending from the base member 120. The plurality of side members 130 may be coupled to the base member 120 so as to define the pod 112, and the coupling member 140 may removably couple the platform member 110 to the bicycle 200, for example as illustrated, to a seat post 206 of the bicycle 200. Though the coupling member 140 is coupled to the seat post 206 of the illustrated bicycle 200, the skilled artisan will appreciate that in various other aspects, the coupling member 140 and/or platform member 110 may be additionally or alternatively coupled to one or more other positions on the frame 220 of the bicycle 200.

A distal end 142 of the coupling member 140 may removably couple the platform member 110 to the bicycle 200. For example, the distal end 142 of the coupling member may include the coupling 146. In various aspects, the coupling 146 may be a quick-release coupling. The coupling member 140 extends from the base member 120. For example, a proximal end 144 of the coupling member 140 may be fixedly coupled to the base member 120. In certain variations, the proximal end 144 of the coupling member 140 may be embedded within the base member 120. For example, greater than or equal to about 40%, and in certain instances, optionally greater than or equal to about 60%, of a total length of the coupling member 140 may be embedded in the base member 120; and less than or equal to about 60%, and in certain instances, optionally less than or equal to about 40%, of a total length of the coupling member 140 may be exposed so as to removably couple the platform member 110 to the bicycle 200, for example to the seat post 206. In this fashion, the coupling member 140 may provide longitudinal support for the platform member 110.

In certain variations, for example as illustrated in FIG. 1C, the base member 120 may be a laminate comprising a plurality of parallel layers. For example, the base member 120 may include parallel first and second layers 122, 124. The proximal end 144 of the coupling member 140 may be disposed between the first and second layers 122, 124. In certain aspects, the base member 120 may include a third layer 126 disposed between the first layer 122 and the second layer 124. The third layer 126 may have a first portion 128A and a second portion 128B. The coupling member 140 may be disposed between the first and second portions 128A, 128B. For example, the second portion 128B may be disposed laterally to the first portion 128A so as to define a space 129 therebetween. The coupling member 140 may be disposed within the space 129.

The plurality of side members 130 may extend perpendicularly from the base member 120 as to define the pod 112. The plurality of side members 130 may be coupled to one or more a longitudinal edges 121 of the base member 120. For example, each of the plurality of side members 130 may include a flanged edge 132. The flanged edge 132 may be disposed between adjacent layers of the plurality of layers of the base member 120. For example, the flanged edge 132 may be disposed between first layer 122 and second layer 124 of the base member 120. In certain aspects, the flanged edge 132 may be disposed between one of the first layer 122 and the third layer 126 and the second layer 124 and the third layer 126 of the base member 120. A distal edge 134 of each side member 130 may be covered with one or more edge guards or padding that cushion any contact therewith. In certain variations, a speaker or radio 198 may be integrated into the platform member 110. For example, as illustrated the speaker or radio 198 may be integrated into one or more side members 130.

In various aspects, the platform member 110 further includes a safety belt 190 that helps position, and in certain aspects, restrain the animal 102. The safety belt 190 may be coupled to one of the base members 120 and the plurality of sides 130. For example, as illustrated, a first end 192 of the safety belt 190 may be coupled to one or more longitudinal edges 121 on a first lateral side 104A of the platform member 110. For example, the first end 192 of the safety belt 190 may be removably coupled to one or more longitudinal edges 121 on a first lateral side 104A of the platform member 110. In certain variations, the first end 192 of the safety belt 190 may be removably coupled to one or more longitudinal edges 121 on a first lateral side 104A of the platform member 110 by a plurality of snaps fasteners 196. A second end 194 of the safety belt 190 may be coupled to a second lateral side 104B of the platform member 110. The second end 194 of the safety belt 190 may be removably coupled to one or more of the plurality of sides 130. For example, one or more side members 130 on the second lateral side 104B of the platform member 110 may have a channel or groove 136 that is configured to receive the second end 194 of the safety belt 190. The skilled artisan will appreciate that various means exists for coupling the first and second ends 192, 194 of the safety belt to the platform member 110.

The brace member 160 may be removably coupled to handlebars 204 of the bicycle 200. As noted above, the brace member 160 assists in the positioning of the animal 102 for safe transport. The brace member 160 may also absorb movements of the animal 102, particularly during transport and in the occurrence of uneven terrain and starts and stops. For example, in various aspects, the brace member 160 may include at least one spring 170 that is configured to provide a limited range of movement or flexibility to the brace member 160. In certain variations, as illustrated, the brace member 160 may include two or more springs 170. The two or more springs 170 may be useful for the transportation of animals of greater than or equal to about 25 lbs.

In various aspects, the each spring 170 may each have a proximal end 172 coupleable to the handlebars 204 of the bicycle 200 and a distal end 174 coupleable to a bumper member 182. For example, the proximal end 172 of the two or more springs 170 may be coupled to a first bar or rod member 176. The first bar member 176 may be removably coupled to the handlebars 204 of the bicycle 200. For example, the bar member 176 may include one or more quick-release couplings 180. The distal end 174 of the two or more springs 170 may be coupled to a second bar or rod member 178. The second bar member 178 may be coupled to the bumper member 182. The bumper member 182 may include one or more support members 184. In certain variations, the bumper member 182 may further include an insulating or padding material 186 that covers the one or more support members 184 and cushions any contact therewith.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A bicycle carrier for the transport of small animals, the bicycle carrier comprising:
a platform member coupleable to a top tube of a bicycle frame, wherein the platform member comprises:
a base member,
a plurality of side members extending perpendicularly from one or more longitudinal edges of the base member so as to define a pod, and
a coupling member extending from the base member and coupling the platform member to a seat post of the bicycle; and
a brace member coupleable to handlebars of the bicycle, wherein the brace member comprises:
at least one spring configured to extend perpendicularly from the handlebars of the bicycle; and
a bumper member coupled to a distal end of the at least one spring, wherein a proximal end of the at least one spring is separated from the distal end and is removably coupled to the handlebars of the bicycle.

2. The bicycle carrier of claim 1, wherein a proximal end of the coupling member is embedded in the base member, and a distal end of the coupling member separated from the proximal end is coupled to the seat post of the bicycle.

3. The bicycle carrier of claim 1, wherein the base member is a laminate comprising a plurality of layers, wherein a proximal end of the coupling member is disposed between a first layer and a second layer of the plurality of layers and a distal end of the coupling member separated from the proximal end is coupled to the seat post of the bicycle.

4. The bicycle carrier of claim 1, wherein the base member is a laminate comprising a plurality of layers, each side member of the plurality of side members includes a flanged edge, and the flanged edge is disposed between a first layer and a second layer of the plurality of layers.

5. The bicycle carrier of claim 1, wherein the base member comprises a first layer parallel with a second layer and a third layer disposed therebetween, the third layer comprises a first portion and a second portion lateral to the first portion, a proximal end of the coupling member is disposed between the first portion and the second portion of the third layer, and a distal end of the coupling member separated from the proximal end is coupled to the seat post of the bicycle.

6. The bicycle carrier of claim 1, wherein each side member of the plurality of side members includes a flanged edge and each of the flanged edges is coupled to the one or more longitudinal edges of the base member.

7. The bicycle carrier of claim 6, wherein each of the plurality of side members includes a distal edge separated from the flanged edge, and wherein the distal edge is covered with one or more edge guards.

8. The bicycle carrier of claim 1, wherein the coupling member includes a proximal coupling that couples a proximal end of the coupling member to the base member and a distal coupling that couples a distal end of the coupling member to the seat post of the bicycle, wherein the distal coupling is a quick-release coupler.

9. The bicycle carrier of claim 1, wherein the platform member further includes a safety belt that is coupled to one of the base member and the plurality of side members.

10. The bicycle carrier of claim 9, wherein a first end of the safety belt is removably coupled to a first side of the platform member and a second end of the safety belt is coupled to a second side of the platform member.

11. The bicycle carrier of claim 1, wherein one or more surfaces of the platform member includes a washable cover.

12. The bicycle carrier of claim 1, wherein an exposed portion of the pod is covered with a traction-assisting material.

13. The bicycle carrier of claim 1, wherein at least one side member of the plurality of side members includes an integrated speaker.

14. The bicycle carrier of claim 1, wherein the proximal end of the at least one spring includes a quick release coupler.

15. The bicycle carrier of claim 1, wherein two springs are configured to extend perpendicularly from the handlebars of the bicycle.

16. The bicycle carrier of claim 1, wherein the bumper member is covered with a padding material.

17. A bicycle carrier for the transport of small animals, the bicycle carrier comprising:
a platform member removably coupled to a top tube of a bicycle frame, wherein the platform member comprises:
a base member comprising a first layer parallel with a second layer and a third layer disposed between the first layer and the second layer, wherein the third layer comprises a first portion and a second portion lateral to the first portion,
a plurality of side members extending perpendicularly from one or more longitudinal edges of the base member so as to define a pod, and
a coupling member having a proximal portion embedded within the base member between the first portion and the second portion of the third layer and a distal portion separated from the proximal portion removably coupling the platform member to a seat post of the bicycle; and
a brace member coupleable to a handlebars of the bicycle, wherein the brace member comprises:
at least one spring having a proximal end removably coupleable to the handlebars of the bicycle; and
a bumper member coupled to a distal end of the at least one spring so as to position the animal.

18. The bicycle carrier of claim 17, wherein the distal portion of the coupling member includes a first quick-release coupler, and the proximal end of the at least one spring includes a second quick-release coupler.

* * * * *